US008015365B2

(12) United States Patent
Kurts et al.

(10) Patent No.: US 8,015,365 B2
(45) Date of Patent: Sep. 6, 2011

(54) REDUCING BACK INVALIDATION TRANSACTIONS FROM A SNOOP FILTER

(75) Inventors: Tsvika Kurts, Haifa (IL); Kai Cheng, Portland, OR (US); Jeffrey D. Gilbert, Hillsboro, OR (US); Julius Mandelblat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 12/156,340

(22) Filed: May 30, 2008

(65) Prior Publication Data

US 2009/0300289 A1  Dec. 3, 2009

(51) Int. Cl.
*G06F 12/00* (2006.01)

(52) U.S. Cl. ........................................ 711/146; 711/148

(58) Field of Classification Search .................... 711/146
See application file for complete search history.

(56) References Cited

U.S. PATENT DOCUMENTS

| | | | |
|---|---|---|---|
| 6,360,301 B1 * | 3/2002 | Gaither et al. ................. | 711/143 |
| 6,598,123 B1 | 7/2003 | Anderson et al. | |
| 6,842,830 B2 | 1/2005 | Khare et al. ................. | 711/150 |
| 6,959,364 B2 | 10/2005 | Safranek et al. ............. | 711/146 |
| 7,093,079 B2 | 8/2006 | Quach et al. ................. | 711/141 |
| 7,167,957 B2 | 1/2007 | Khare et al. .................. | 711/151 |
| 2006/0053257 A1 * | 3/2006 | Sistla et al. ................... | 711/143 |
| 2007/0233965 A1 | 10/2007 | Cheng et al. | |
| 2007/0233966 A1 | 10/2007 | Chinthanmani et al. | |
| 2007/0239941 A1 | 10/2007 | Looi et al. | |
| 2007/0294481 A1 | 12/2007 | Hoover | |
| 2008/0005485 A1 | 1/2008 | Gilbert et al. ................ | 711/146 |

FOREIGN PATENT DOCUMENTS

GB  2 444 818 A  6/2008

OTHER PUBLICATIONS

Intellectual Property Office of the United Kingdom, Office Action dated Sep. 20, 2010 in United Kingdom application No. 0909103.4.
German Patent and Trademark Office, Office Action dated Jun. 16, 2010 in German patent application No. 102009022151.4-53.
United Kingdom Intellectual Property Office, Combined Search and Examination Report dated Aug. 28, 2009, in a related application.
The State Intellectual Property Office of the People's Republic of China, Notice on the First Office Action mailed Apr. 14, 2011 in Chinese application No. 200910145575.1.

* cited by examiner

*Primary Examiner* — Tuan Thai
*Assistant Examiner* — Ngoc V Dinh
(74) *Attorney, Agent, or Firm* — Trop, Pruner & Hu, P.C.

(57) ABSTRACT

In one embodiment, the present invention includes a method for receiving an indication of a pending capacity eviction from a caching agent, determining whether an invalidating writeback transaction from the caching agent is likely for a cache line associated with the pending capacity eviction, and if so moving a snoop filter entry associated with the cache line from a snoop filter to a staging area. Other embodiments are described and claimed.

20 Claims, 4 Drawing Sheets

REDUCING BACK INVALIDATION TRANSACTIONS FROM A SNOOP FILTER

BACKGROUND

In a multi-processor system having multiple processors and multiple caches, each cache may store a copy of a piece of data stored in memory. Problems arise when more than one cache contains a copy of the same piece of data. Various techniques have been developed to ensure data coherency across multiple caches. For example, when the data in one cache is modified, other copies of the data are marked as invalid so that they will not be used.

To help maintain cache coherency, many systems include a directory such as a snoop filter to aid in determining presence and state of data in cache lines of such multiple caches. A snoop operation can take place in which an agent of a bus monitors memory transactions, e.g., read/write operations. The agent may record the states of the cache lines involved in the memory transactions in the snoop filter. The state of a cache line may indicate whether the line has only one valid copy outside of the main memory, has multiple valid copies shared by multiple caches, or has no copies outside of main memory (i.e., it has been invalidated in all caches). A data entry in the snoop filter is often indexed in part by a portion of its address in the main memory.

The snoop filter sometimes may run out of space to record the state of a line for a new memory transaction, and may need to evict an entry from the snoop filter to accommodate the new transaction. Often when an entry is evicted from the snoop filter, a back-invalidation message is sent to every processor cache that potentially holds a valid copy of the line associated with the evicted entry. Many cache misses are due to snoop filter originated back invalidations of a cache line that was about to be used.

Some snoop filters are referred to as inclusive snoop filters (ISFs), in that the information in the snoop filter is maintained inclusively with cache lines of the caches that the snoop filter covers. In an inclusive cache hierarchy, one of the cache memories (i.e., a lower-level cache memory) includes a subset of data contained in another cache memory (i.e., an upper-level cache memory). Cache hierarchies may improve processor performance, as they allow a smaller cache having a relatively fast access speed to contain frequently used data. In turn, a larger cache having a slower access speed than the smaller cache stores less-frequently used data (as well as copies of the data in the lower-level cache).

Snoop filters, as with the caches they cover, allocate and evict entries. However, because an inclusive cache hierarchy with an ISF stores some common data, eviction of a cache line in one cache level or snoop filter may cause a corresponding cache line eviction in another level of the cache hierarchy to maintain cache coherency. ISFs must insure that a cache line whose address is evicted from the snoop filter be removed from all covered caches. In general, this involves sending a back invalidation request from the snoop filter to the covered caches. When the snoop filter sends many such requests, it consumes interconnect bandwidth that can increase effective memory latency, as well as potentially removing useful cache entries.

DETAILED DESCRIPTION

Figure 1:
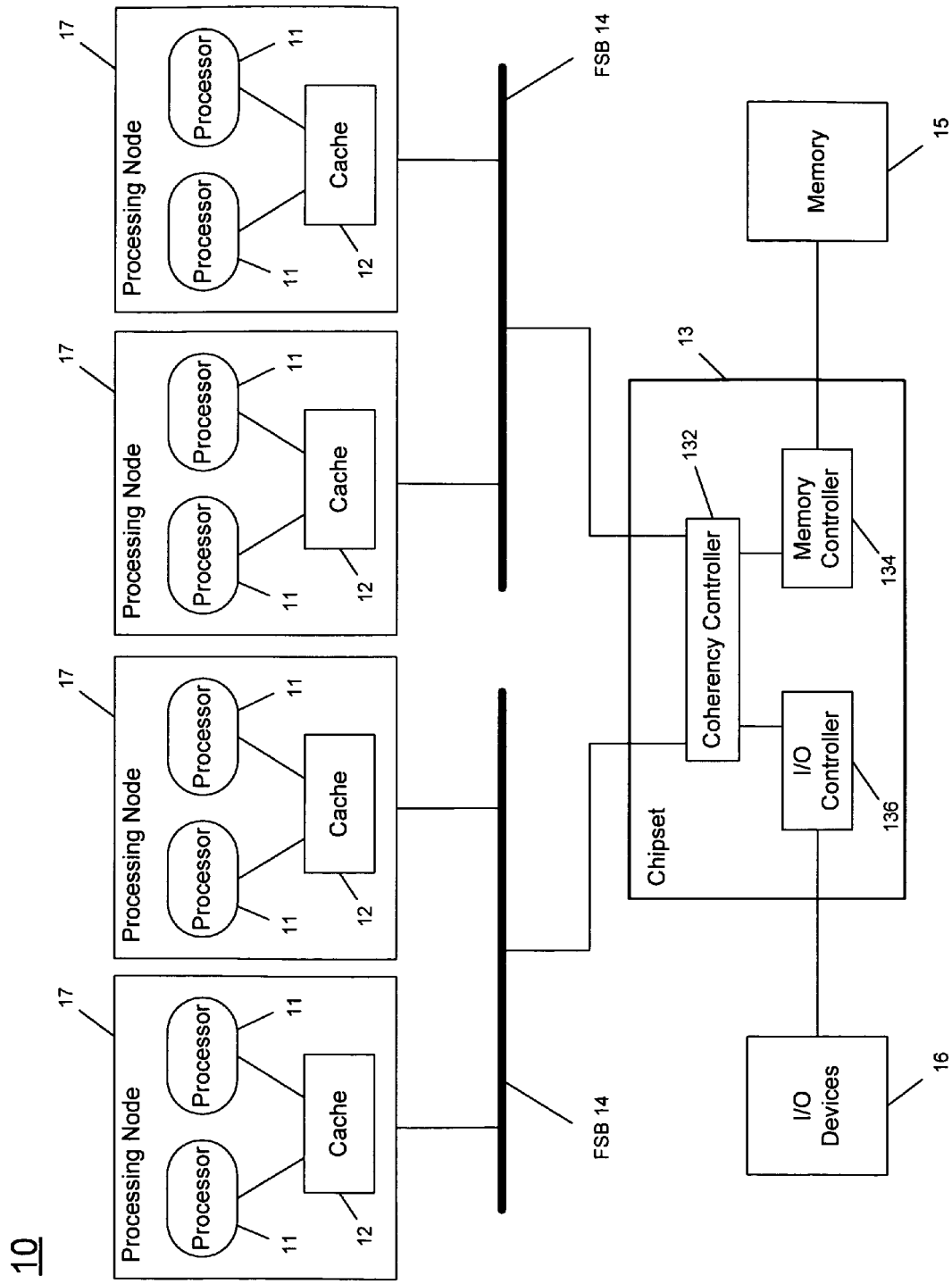
FIG. 1 is a block diagram of an embodiment of a multi-processor system.

In various embodiments, a snoop filter may be configured such that it sends a reduced number of back invalidation messages to the caches to which it is coupled. In this way, fewer entries may be evicted from the caches, improving cache hit rates. Reducing the number of back invalidation messages will also reduce system interconnect traffic, improving memory latency and other system efficiency factors. More specifically, in various implementations a snoop filter that is to evict an entry from the snoop filter (where the entry is associated with a given cache line) may avoid sending the back invalidation message if it is likely that a corresponding cache will shortly issue its own invalidation message for that cache line. In this way, the expense of sending the back invalidation message from the snoop filter can be avoided.

Depending on cache size and application, a significant portion of cache lines evicted from a snoop filter will be modified (also referred to as "dirty"). When a cache decides to evict a dirty line, it generally issues an "explicit writeback" (EWB) transaction. In some implementations, this transaction is referred to as an invalidating explicit writeback (or BWL.INVLD) transaction, which combines the two semantics into a single transaction. More specifically, this transaction reports the current value of the cache line in question, and provides an indication that the cache line has been completely removed from all levels of the cache hierarchy. Embodiments leverage this second attribute so that a snoop filter covering that cache can silently remove its associated entry. That is, the snoop filter can evict the corresponding entry from the snoop filter without issuance of a back invalidation request.

Thus, when an ISF can determine that a covered cache is likely to issue an invalidating explicit writeback transaction for an ISF entry that has been or is about to be evicted, it may delay issuing an invalidation request. Then, when the cache issues this transaction for the cache line in question, the snoop filter need not issue the invalidation request.

Thus embodiments may provide a first mechanism that provides an ISF an indication that an invalidating explicit writeback is likely to be issued for an evicted (or about to be evicted) entry in that snoop filter, and a second mechanism to utilize this information to refrain from issuing an invalidation request for a given period of time. If the associated invalidating explicit writeback transaction is received during this time period, the snoop filter can avoid sending the request.

In one embodiment, the first mechanism may utilize hints with read transactions that indicate which cache line location in a particular cache is being evicted to make room for the read results. The hint itself can include information, referred to herein as an "EWB hint" to report that the evicted way is modified. An alternate form of this mechanism may use information in the snoop filter itself. For example, after receiving the eviction hint, the snoop filter may hold an indication that the cache obtained exclusive ownership of the line to be evicted. Requesting exclusive ownership of a line is highly correlated with modifying that line (typically, well over 90% probability for Intel® 64 and Intel® Architecture (IA)-32 instruction set architecture (ISA) applications). Thus, this indication may cause the snoop filter to delay issuing an invalidation message.

In one embodiment, the second mechanism can be implemented as a buffer, such as a virtual or physical queue or pool of invalidation requests. That is, the snoop filter may be segregated into a primary snoop filter portion, where all snoop filter entries are stored, and a secondary snoop filter portion, which may be referred to herein as a staging pool or invalidation pool, in which entries to be evicted from the snoop filter are stored. Thus prior to eviction, and for at least a time period (e.g., a predetermined time period which may be on the order of approximately 100 nanoseconds in some embodiments) in which an invalidation request from the snoop filter is withheld from transmission, evicted entries from the primary snoop filter portion may be stored in this staging pool. Thus incoming invalidating explicit writeback transactions can be used to cause a search of this pool that includes the set of pending entries awaiting invalidation requests and delete any matching item. Pending invalidations in this virtual or physical structure may be issued after some period of time, be issued on some age order basis should the pool or queue population reach some level, and/or be issued when sufficient systems resources become available.

Referring to FIG. 1, shown is a block diagram of an embodiment of a multi-processor system 10. As shown in FIG. 1, system 10 may have a plurality of processing nodes 17 interconnected with a chipset 13. Each of the processing nodes 17 may include one or more processors 11 (two processors per processing node are shown, where each processor may be a processor core or a multicore processor) and a cache 12. Each cache 12 may be locally accessibly by processors 11 of a "home node" (the processing node in which this cache is located), and remotely accessible by processors 11 of "remote nodes" (the processing nodes other than the home node). Cache 12 is referred to as a "local cache" with respect to processors 11 of the home node, and may be formed of a relatively small but fast memory such as a static random access memory (SRAM). Processing nodes 17 may be coupled to chipset 13 via one or more front side buses (FSBs) 14 (only two FSBs are shown) or other types of interconnects, such as point-to-point interconnects. One or more of processing nodes 17 may be implemented on a single chip. System 10 may be used as a server system because of the high collective processing power it possesses, although the scope of the present invention is not limited in this regard.

Chipset 13 may include a coherency controller 132, which may include a snoop filter in accordance with an embodiment of the present invention, for processing requests received from FSBs 14 and maintaining data coherency among caches 12. The functions of coherency controller 132 will be discussed in detail below with reference to FIG. 2. Chipset 13 may include a memory controller 134 for providing an interface for processing nodes 17 and other components of system 10 to access to storage locations of a memory 15. Memory 15 may be a dynamic random access memory (DRAM) device, or other volatile or non-volatile memory devices suitable for server or general applications.

Chipset 13 may also include an I/O controller 136 to provide an interface for processing nodes 11 and other components of system 10 to access to one or more I/O devices 16. I/O devices 16 may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. In some embodiments, chipset 13 may be implemented as a single chip. In some embodiments, chipset 13 may be implemented as two or more chips.

Processors 11 may store lines of memory in their respective local caches 12 to facilitate quick access. Caches 12 may store data, instructions, or a combination of both. For each cache line, caches 12 may store a tag (e.g., a portion of a memory address) to associate or map the cache line to a corresponding line in memory 15. Caches 12 may also store and update a coherency state for each cache line. For example, caches 12 may support MESI coherency states in which a cache line may have a modified (M) state, an exclusive (E) state, a shared (S) state, or an invalid (I) state.

Figure 2:
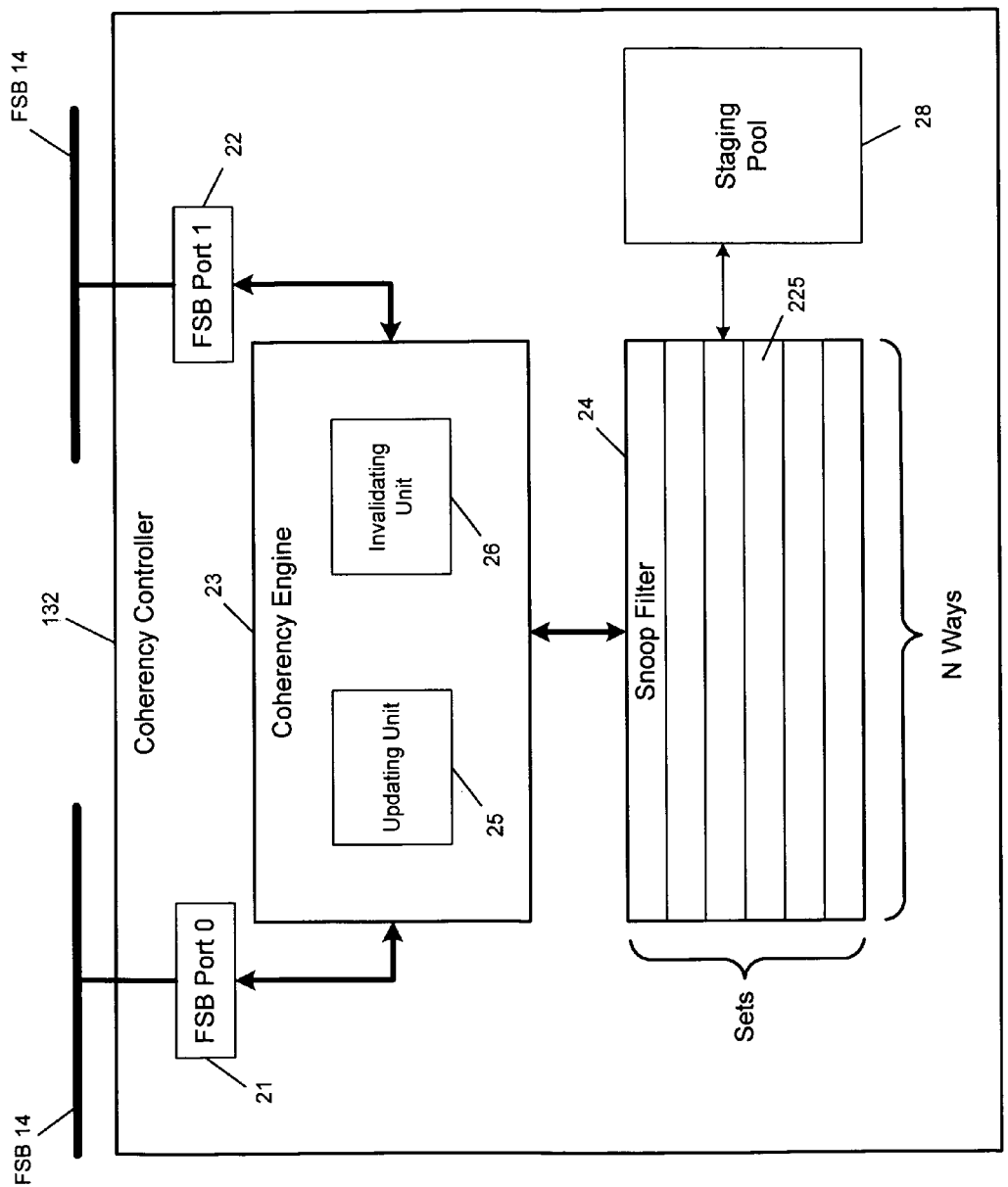
FIG. 2 is a block diagram of a coherency controller in accordance with one embodiment of the present invention.

Referring to FIG. 2, in one embodiment, coherency controller 132 may include a snoop filter 24 to provide coherency information of the cache lines. As shown in FIG. 2, one embodiment of coherency controller 132 may have several FSB ports (FSB_-Port_0 21 and FSB_Port_1 22), a coherency engine 23, a snoop filter 24, and a staging pool 28.

Snoop filter 24 may include one or more storage arrays such as, for example, a fully associative array, set associative array, or a directly mapped array that includes ways or lines to store coherency information. In one embodiment, snoop filter 24 comprises a N-way set associative array in which each of the sets includes N slots (or ways) 225 (only one is shown) for storing coherency information of N cache lines. A cache line may be mapped to one of the sets by, for example, using certain bits of the memory address. Each way 225 may store information for a line. The information may include an address tag, MESI coherency state information, and a presence vector. The presence vector may indicate which FSB 14 connects to the cache that might have the cache line.

In one embodiment, snoop filter 24 may store only those entries that are associated with lines in the E/M state. Such snoop filter entries may be referred to as E/M entries. That is, snoop filter 24 may store an E/M entry for a line if any cache contains or may contain an exclusive copy of the line outside of main memory. Storing only the E/M entries may reduce the total number of entries stored in snoop filter 24 and may effectively expand the size of the snoop filter. As a tradeoff, storing only the E/M entries may cause the number of snoops generated by snoop filter 24 to increase. However, especially for read intensive applications, overall system performance generally improves.

As further shown in FIG. 2, snoop filter 24 may be associated with staging pool 28. While shown with such structures in the embodiment of FIG. 2, the scope of the present invention is not limited in this regard and in various implementations staging pool 28 may be part of snoop filter 24. Staging pool 28 may store entries evicted from snoop filter 24, before such entries are actually evicted (and thus removed from staging pool 28) and a corresponding invalidation message is transmitted from coherency engine 23 to one or more processor nodes.

In one embodiment, when a request for a memory transaction arrives at coherency controller 132, coherency engine 23 may determine where to forward the request. A memory transaction refers to a transaction that requires access to memory or a cache. Coherency engine 23 may lookup snoop filter 24 to determine whether the snoop filter has information of the requested line. If snoop filter 24 has the information, coherency engine 23 forwards the request to the FSB port (21 or 22) connecting to the cache that has a current copy of the line based on the presence vector of the line. If the transaction might potentially change the state of the requested line, coherency engine 23 updates the information in snoop filter 24 using updating unit 25 to reflect the changes. If snoop filter 24 does not have information for the line, coherency engine 23 may add an entry to the snoop filter to record coherency information of the requested line, also using updating unit 25.

If, in the context of inserting a new entry into a full snoop filter or upon receipt of an invalidation transaction from a cache that is associated with a given entry in snoop filter 24, an invalidating unit 26 of coherency engine 23 may be used to cause invalidation of an entry in the snoop filter. In performing such invalidations, the selected entry will be evicted from snoop filter 24. However, if it is likely that an invalidating explicit writeback transaction will be received from a cache for the evicted entry, invalidating unit 26 may cause snoop filter 24 to pass the entry to staging pool 28, thus avoiding transmission of a back invalidation message.

Figure 3:
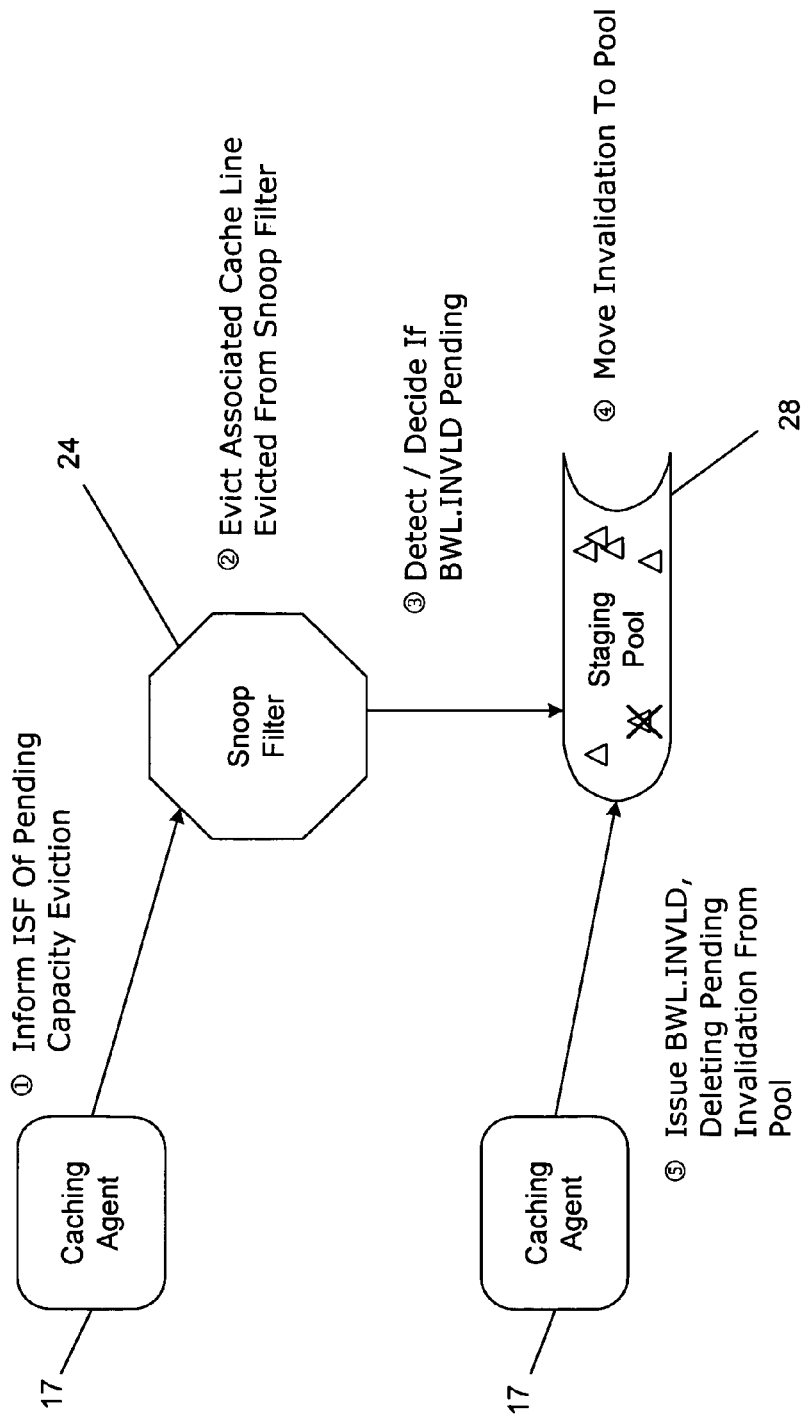
FIG. 3 is a block diagram illustrating the interaction between a caching agent, snoop filter, and a staging area in accordance with an embodiment of the present invention.

Referring now to FIG. 3, shown is a block diagram illustrating the interaction between a caching agent, snoop filter, and a staging area in accordance with an embodiment of the present invention. Specifically, FIG. 3 shows a caching agent 17, which may correspond to one of the processor nodes of FIG. 2. Caching agent 17 is coupled to the snoop filter 24, which in turn is coupled to a staging pool 28. For ease of illustration, staging pool 28 is further shown coupled to caching agent 17. However, understand that in various implementations snoop filter 24 and staging pool 28 may be part of a chipset or other interface component that in turn is coupled to a corresponding caching agent.

During operation, a cache memory associated with caching agent 17, such as a level 2 (L2) cache may determine that it is at a capacity level and thus to store additional information, it needs to evict one or more entries. To do so, caching agent 17 may send a capacity eviction transaction to the interface that includes snoop filter 24. Because snoop filter 24 is an inclusive snoop filter, upon receipt of such a capacity eviction transaction, snoop filter 24 may cause the associated entry for the cache line that is to be evicted from caching agent 17 to be evicted from the snoop filter itself. As shown in FIG. 3, if snoop filter 24 determines that an invalidating explicit writeback transaction is likely to be issued from caching agent 17 for this cache line, instead of directly evicting the entry from snoop filter 24 and causing transmission of an invalidation request from snoop filter 24 to the caching agent with exclusive ownership of the line, in this instance snoop filter 24 may cause the pending entry to be moved to staging pool 28. That is, staging pool 28 may include storage for various entries that are awaiting eviction from snoop filter 24. If caching agent 17 issues an invalidating eviction transaction prior to expiration of a given period of time after this entry is placed into staging pool 28, the entry may be evicted from staging pool 28 without transmission of the back invalidation request.

Figure 4:
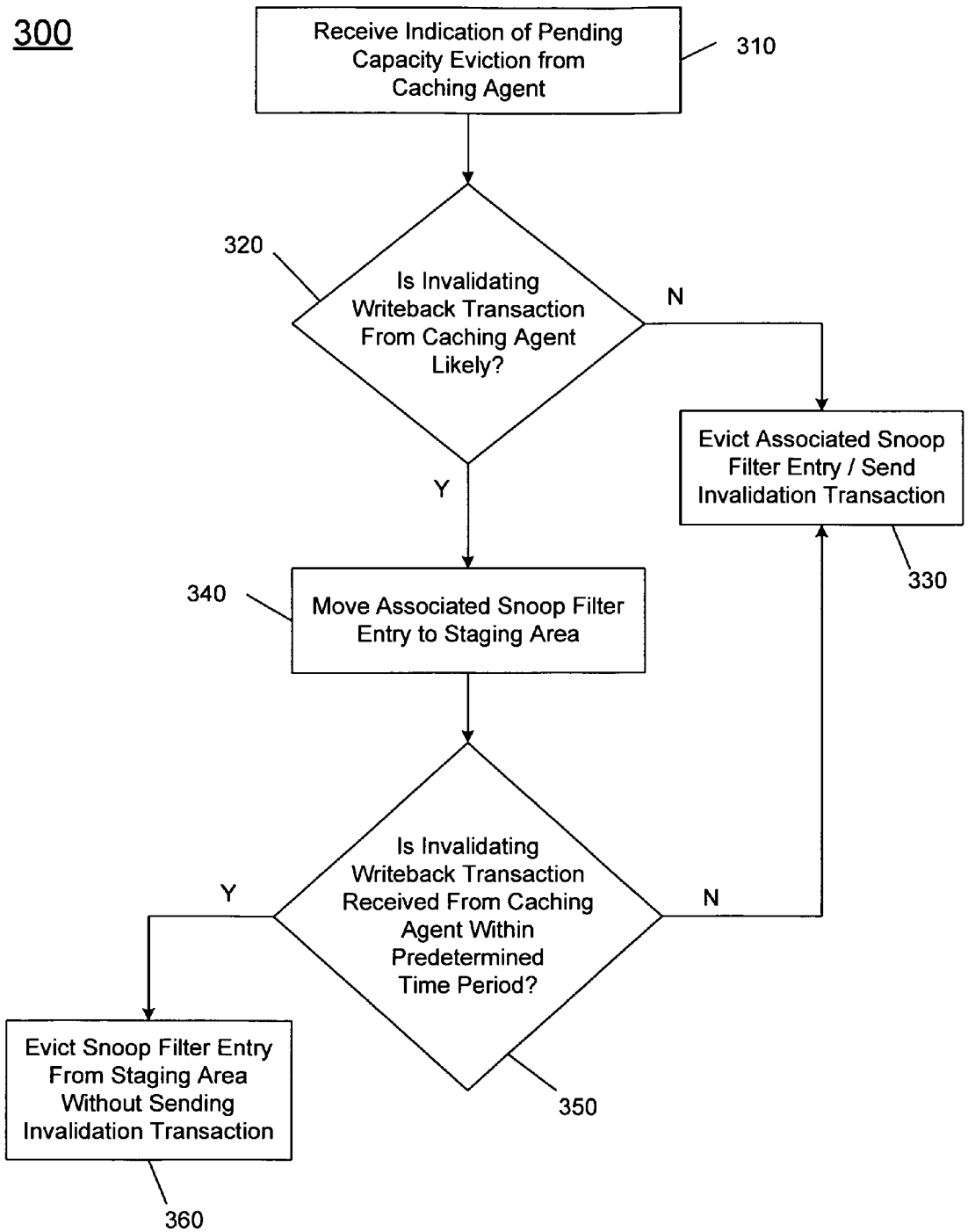
FIG. 4 is a flow diagram of a method in accordance with one embodiment of the present invention.

Referring now to FIG. 4, shown is a flow diagram of a method in accordance with one embodiment of the present invention. Method 300 may be used to delay transmission of an invalidation request from a snoop filter in accordance with an embodiment of the present invention. As shown in FIG. 4, method 300 may begin by receiving an indication of a pending capacity eviction from a caching agent (block 310). Next, it may be determined by the snoop filter whether an invalidation writeback transaction from the caching agent is likely (diamond 320). While not limited in this regard, as discussed above this determination may be made based upon one or more hints from the caching agent, and/or based on information already present in the snoop filter. If such a transaction is unlikely, control passes to block 330, where the associated snoop filter entry may be evicted and an invalidation transaction may be sent from the snoop filter to one or more caching agents, based on information in the snoop filter.

However, as discussed above transmission of such an invalidation transaction can impact system interconnect bandwidth. Accordingly, in various embodiments if it is determined that an invalidating writeback transaction from the caching agent is likely, control instead passes from diamond 320 to block 340. There, the associated snoop filter entry may be moved to a staging area such as a staging or invalidation pool. Then it may be determined whether an invalidating writeback transaction is received from the caching agent within a predetermined length of time from when the entry was moved to the staging area (diamond 350). That is, this staging pool may correspond to a list of invalidation transactions to be sent, unless an entry is deleted by receipt of an incoming invalidating writeback transaction within a given time period. In this way, when such an invalidating writeback transaction is received, transmission of an invalidation message from the snoop filter is avoided.

If the invaliding writeback transaction is received within this period, the snoop filter entry may be evicted without sending an invalidation transaction (block 360). If, however, such a transaction is not received from the caching agent within this predetermined time period, control instead passes from diamond 350 to block 330, discussed above. While shown with this particular implementation in the embodiment of FIG. 4, the scope of the present invention is not limited in this regard.

Embodiments thus can reduce the system interconnect bandwidth used by an inclusive snoop filter, which can reduce effective memory latency and improve system performance. Further, by modulating invalidating traffic based at least in part on system resource availability, system performance variability can be reduced.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving an indication of a pending capacity eviction from a caching agent in a coherency controller, the pending capacity eviction corresponding to a read transaction that indicates that a cache line associated with the pending capacity eviction is to be evicted to provide space for results of the read transaction;

determining in the coherency controller whether an invalidating writeback transaction from the caching agent is likely to be sent from the caching agent to the coherency controller for the cache line associated with the pending capacity eviction; and if the invalidating writeback transaction is likely, moving a snoop filter entry associated with the cache line from a snoop filter of the coherency controller to a staging area of the coherency controller.

2. The method of claim 1, further comprising if the invalidating writeback transaction is not likely, evicting the snoop filter entry and sending an invalidation transaction from the snoop filter to one or more caching agents, based on information in the snoop filter.

3. The method of claim 1, further comprising determining whether the invalidating writeback transaction is received from the caching agent within a predetermined time period from when the snoop filter entry was moved to the staging area.

4. The method of claim 3, further comprising evicting the snoop filter entry from the staging area without sending an invalidation transaction if the invalidating writeback transaction is received within the predetermined time period.

5. The method of claim 4, further comprising sending the invalidation transaction from the snoop filter to one or more caching agents if the invalidating writeback transaction is not received within the predetermined time period.

6. The method of claim 5, further comprising sending the invalidation transaction to the one or more caching agents from the snoop filter based at least in part on a system resource level.

7. The method of claim 1, further comprising determining that the invalidating writeback transaction is likely based at least in part on a way hint from the caching agent to indicate that a cache line to be evicted is modified.

8. The method of claim 1, further comprising determining that the invalidating writeback transaction is likely based on an indication in the snoop filter that the corresponding cache line to be evicted is in an exclusive state in the caching agent.

9. An apparatus comprising:
a snoop filter to store entries each associated with a cache line of a cache memory, wherein the snoop filter is inclusive with a plurality of cache memories; and
a coherency unit coupled to the snoop filter to control the snoop filter, wherein the coherency unit is to withhold transmission of a back invalidation transaction for a snoop filter entry to be evicted from the snoop filter responsive to a pending capacity eviction from the cache memory if the cache memory is likely to send an invalidation transaction to the coherency unit for a cache line corresponding to the evicted snoop filter entry.

10. The apparatus of claim 9, further comprising a storage area coupled to the snoop filter to store snoop filter entries evicted from the snoop filter and before a back invalidation transaction is sent from the coherency unit.

11. The apparatus of claim 10, wherein the coherency unit is to move the evicted snoop filter entry to the storage area upon receipt of an eviction transaction for the cache line corresponding to the snoop filter entry.

12. The apparatus of claim 11, wherein the coherency unit is to delete the snoop filter entry from the storage area upon receipt of an invalidation transaction for the cache line corresponding to the snoop filter entry, and without transmission of the back invalidation transaction.

13. The apparatus of claim 11, wherein the coherency unit is to determine that the invalidation transaction is likely based at least in part on way hint information in the eviction transaction.

14. The apparatus of claim 9, wherein the coherency unit is to determine that the invalidation transaction is likely if the snoop filter entry is in a modified state.

15. The apparatus of claim 11, wherein the coherency unit is to transmit the back invalidation transaction if the snoop filter entry remains in the storage area for a predetermined time period.

16. A system comprising:
a first processor including at least one core and at least one cache memory;
a second processor including at least one core and at least one cache memory;
a chipset coupled to the first and second processors, the chipset including a snoop filter to store entries each associated with a cache line of one of the cache memories, a coherency unit coupled to the snoop filter to withhold transmission of a back invalidation transaction for a snoop filter entry to be evicted from the snoop filter responsive to a pending capacity eviction from one of the first and second processors if the first or second processor is likely to send an invalidation transaction to the coherency unit for a cache line corresponding to the evicted snoop filter entry, and a storage area coupled to the snoop filter to store snoop filter entries evicted from the snoop filter and before a back invalidation transaction is sent from the coherency unit; and
a dynamic random access memory (DRAM) coupled to the chipset.

17. The system of claim 16, wherein the coherency unit is to move an evicted snoop filter entry to the storage area upon receipt of an eviction transaction for the cache line corresponding to the snoop filter entry.

18. The system of claim 17, wherein the coherency unit is to delete the snoop filter entry from the storage area upon receipt of an invalidation transaction for the cache line corresponding to the snoop filter entry, and without transmission of the back invalidation transaction.

19. The system of claim 18, wherein the coherency unit is to determine that the invalidation transaction is likely based at least in part on way hint information in the eviction transaction.

20. The system of claim 16, wherein the coherency unit is to transmit the back invalidation transaction if the snoop filter entry remains in the storage area for a predetermined time period.

* * * * *